3,426,004
CROSSLINKED ACRYLIC ACID INTERPOLYMERS
Frank A. Wagner, Avon Lake, Ohio, assignor to The
B. F. Goodrich Company, New York, N.Y., a corporation of New York
No Drawing. Filed Jan. 13, 1965, Ser. No. 425,338
U.S. Cl. 260—80.3     13 Claims
Int. Cl. C08f *3/44, 3/46;* C09j *3/14*

ABSTRACT OF THE DISCLOSURE

Interpolymers prepared by the interpolymerization of acrylic or methacrylic acid with a polyallyl phosphate or polyallyl phosphite have been found to be improved thickening or suspending agents useful for mucilaginous applications having superior shear resistance. These polymers are insoluble but swellable in water and the maximum thickening is achieved by treating the aqueous suspension of the polymer with a neutralizing agent.

---

This invention relates to new, crosslinked, water-insoluble, acrylic acid interpolymers derived from a monomeric mixture comprising acrylic acid and a polyunsaturated organic phosphate compound, and to methods for the preparation of the interpolymers. More particularly, this invention corcerns crosslinked interpolymers comprised of at least 10% by weight of acrylic or methacrylic acid or mixtures thereof, a minor amount of a polyallyl phosphate or phosphite ester, and optionally one or more monoolefinically unsaturated compounds copolymerizable therewith.

Various types of synthetic resins are known which are crosslinked interpolymers of acrylic or methacrylic acid or mixtures of said acids with a minor amount of a polyunsaturated compound having a plurality of terminally unsaturated polymerizable groups, e.g., about 0.5 to about 2.5% by weight of the polyunsaturated crosslinking monomer based on total interpolymer weight. For example, U.S. Patent No. 2,798,053 describes crosslinked copolymers of acrylic or methacrylic acid with said minor amounts of vinyl, allyl and methallyl ethers of polyhydric alcohols having at least four carbon atoms and at least three alcoholic hydroxy groups, wherein the preferred polyalkenyl polyether monomers are polyallyl sucrose and polyallyl pentaerythritol, desirably containing an average of at least about 3 allyl groups for each molecule of sucrose or pentaerythritol, the allyl groups attached thereto by means of ether linkages. U.S. Patent No. 2,858,281 describes acrylic acid copolymers containing crosslinking monomers which are the polymeric, benzene-soluble products resulting from Na or K polymerization of diolefins, preferably conjugated dienes. These polymers have a very large proportion of 1,2 structures in the chain and consequently have a plurality of $CH_2=$ side groups which can be copolymerized with the acrylic acids. U.S. Patent No. 2,958,679 discloses crosslinked copolymers of acrylic acid and polyallyl or polymethallyl trimethylene trisulfones. U.S. Patent No. 2,985,631 discloses copolymers of acrylic acid and the polyvinyl, polyallyl or polymethallyl silanes or the corresponding tin compounds, tetrallyl or tetravinyl silane or tin being preferred.

The aforedescribed interpolymers, other similarly constituted crosslinked carboxylic interpolymers, and the interpolymers embodied in the present invention, and their salts (i.e., sodium, ammonium, and amine salts) are characterized by being insoluble in water but capable of swelling rapidly to a high degree therein; they are capable of thickening water at extremely low concentrations of the interpolymers to form a heavy mucilage or gel. These interpolymers and their salts also are insoluble in aliphatic and aromatic hydrocarbons but they are solvent-sensitive and can thicken non-polar solvents under certain conditions, although with comparatively less effectiveness than in the thickening of water. These crosslinked carboxylic-containing interpolymers are useful for preparing printing pastes, auto polishes and cleaners, household polishes and cleaners, cosmetic preparations such as hair creams and pastes, gelled hand cleaners, carrying agents, sand suspensions in oil and water well treatment, and thickening of flood water for secondary crude oil recovery.

The advantage of the interpolymers of this invention is the capability of the interpolymers and their salts to thicken water to form generally heavier mucilages and gels than the previously known crosslinked carboxylic interpolymers, at low and comparative concentrations of polymer. Moreover, the mucilages prepared with the interpolymers of this invention, in general, have greater clarity, i.e., are more transparent, and the mucilages exhibit more stability upon aging, at times even shown a viscosity increase with age.

The crosslinked interpolymers of this invention are composed of (A) At least 10% by weight of polymerized units of acrylic acid or methacrylic acid or mixtures thereof;

(B) From 0.1 to 2% by weight of polymerized units of a polyallyl phosphate or polyallyl phosphite ester crosslinking monomer, or mixture thereof, conforming to the formulae:

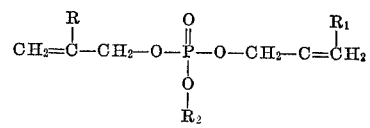

and

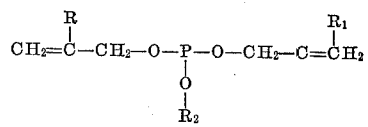

wherein R and $R_1$ are independently selected from the group consisting of a hydrogen atom and a methyl radical, and $R_2$ is selected from the group consisting of a hydrogen atom, an allyl radical, a methallyl radical, an alkyl radical, an aralkyl radical, an aryl radical and an alkaryl radical; and (C) From 0 to 89.9% by weight of polymerized units of one or more other monoolefinically unsaturated monomers copolymerizable with the acrylic or methacrylic acid and the polyallyl phosphate ester crosslinking monomer. (It is, of course, understood that the total of components (A), (B) and (C) equals 100%.)

Representative examples of suitable crosslinking monomers include triallyl phosphate, diallyl monohydrogen phosphate, dimethallyl monohydrogen phosphate, diallyl monomethyl phosphate, diallyl monophenyl phosphate, diallyl mono(4-ethylphenyl)phosphate, diallyl monobenzyl phosphate, etc. and the corresponding phosphites. The allyl phosphates(ites) can be prepared by classical methods that are known in the art and certain of these compounds are commercially available. Triallyl phosphate and triallyl phosphite are preferred crosslinking agents.

Typical examples of other monoolefinically unsaturated monomers copolymerizable with the acrylic acids and the crosslinking monomers are other polymerizable alpha, beta-unsaturated carboxylic acids such as ethacrylic acid, chloroacrylic acid, maleic acid, fumaric acid, citraconic acid, mesaconic acid, glutaconic acid and the like. Other representative olefinically unsaturated copolymerizable monomers are acrylamide, methacrylamide, N-methyl acrylamide, N-ethyl acrylamide, N-t-butyl acrylamide, styrene, ethylene, isobutylene, acrylonitrile, methacrylonitrile, methyl acrylate, ethyl acrylate, the propyl acrylates, butyl acrylates, amyl acrylates, hexyl acrylates, heptyl acrylates, octyl acrylates, methyl methacrylate, methyl ethacrylate, vinyl acetate, vinyl propionate, vinyl butyrate, isopropenyl acetate, isopropenyl propionate, isopropenyl butyrate, vinyl benzoate, isopropenyl benzoate, vinyl pyridines, vinyl chloride, vinyl bromide, vinylidene chloride, vinylidene bromide, methyl vinyl ether, ethyl vinyl ether, n-butyl vinyl ether, methyl vinyl ketone, ethyl vinyl ketone, methyl isopropenyl ketone, dimethyl maleate, diethyl maleate, dimethyl fumarate, diethyl fumarate, and others.

The preferred carboxylic interpolymers of this invention contain at least 50% by weight of acrylic or methacrylic acid or mixtures thereof, from 0 to 49.9% of one or more of the other monoolefinically unsaturated monomers and 0.1 to 2% of the polyallyl monomer. At least 90% of acrylic acid and 0 to 9.9% of the other olefinically unsaturated compounds are more preferred. The range of the polyallyl phosphate(ite) in the interpolymer for producing a resin having the best water-thickening properties is from about 0.75 to about 1.25% by weight. Thus, the most preferred interpolymers consist of 98 to 99.9% of acrylic acid and 0.1 to 2% of triallyl phosphate, and even more desirable are those of 98.75% to 99.25% of acrylic acid and 0.75 to 1.25% of triallyl phosphate.

The preferred method of preparation of the interpolymers of this invention is the polymerization of the mixture of their constituent monomers in an inert organic diluent having some solubilizing action on one or more of the monomeric ingredients but substantially none on the resultant interpolymer. Polymerization in mass may be employed, but is not preferred because of the difficulty in working up the solid polymeric masses obtained. Polymerization in an aqueous medium containing a water-soluble free-radical catalyst is an operative method but is less desirable than polymerization in the organic inert diluent. In aqueous polymerizations, the product is recovered either as a granular precipitate or as a highly swollen gel, either of which may be used directly or further subdivided and dried.

As above-mentioned, polymerization in an organic liquid diluent which may be a solvent for the monomers but is a non-solvent for the interpolymer, or in a mixture of such solvents, in the presence of a solvent-soluble free-radical catalyst such as benzoyl peroxide and azobisisobutyronitrile is most preferred because the product is usually obtained as a very fine friable and often fluffy precipitate which, after solvent removal, seldom requires grinding or other further treatment before use. Suitable diluents include benzene, toluene, xylene, ethyl benzene, tetralin, hexane, heptane, octane, carbon tetrachloride, methyl chloride, ethyl chloride, ethylene dichloride, bromotrichloro methane, chlorobenzene, acetone, methyl ethyl ketone, and others, and mixtures of these and other solvents.

The polymerization in the diluent medium may be carried out in the presence of a free-radical catalyst in a closed vessel containing an inert atmosphere and under autogenous pressure or artifically-induced pressure, or in an open vessel under reflux at atmospheric pressure. The temperature of the polymerization may be varied from 0° C. or lower, depending on the freezing point of the diluent, to 100° C. or higher, more preferably from 20° to 90 C., the temperature depending to a large degree upon the activity of the monomers and catalyst used and the molecular weight desired in the polymeric product. The molecular weights of the product interpolymers are greater for those made in the lower temperature range than for those made in the higher temperature range. Polymerization at 50° to 90° C. under atmospheric pressure using a free-radical catalyst generally gives a polymer yield of 90 to about 100% of theory in less than 20 hours, usually in less than 6 hours. Suitable free-radical catalysts include peroxides such as sodium, potassium and ammonium persulfates, caprylyl peroxide, benzoyl peroxide, and pelargonyl peroxide, hydrogen peroxide, cumene hydroperoxides, tertiary butyl diperphthalate, tertiary butyl perbenzoate, sodium peracetate, sodium percarbonate and the like as well as azobisisobutyronitrile and others. Other useful catalysts are the so-called "redox" type of catalyst and the heavy-metal activated catalyst systems. Generally, from about 0.1 to 2.5% by weight or more of catalyst based on monomers weight is sufficient in the process of the present invention. Polymerization may also be induced by radicals formed in the polymerization system by nuclear radiation, X-rays and ultra-violet radiation.

The interpolymers of this invention are high molecular weight resins but the actual molecular weights thereof are difficult to measure. It is believed that the molecular weights of the linear carbon chain structural portions of the interpolymers are in the range of about 100,000 to about 300,000, however, the crosslinking monomer units therein are believed to bring the molecular weights of the interpolymers into the range of about 2,000,000 to 3,000,000 or higher.

As previously stated, the interpolymers of this invention are especially useful in soft, mucilaginous aqueous compositions containing a small amount of the interpolymer, e.g., in the range of about 0.05% to about 2%, preferably about 1%, by weight of the gel. The swollen interpolymers generally do not attain their maximum volume in water until a portion of the free carboxyl groups in said interpolymers are converted to an alkali, ammonium or amine salt. It therefore is advantageous to neutralize the interpolymer while it is being dispersed in the aqueous composition to a pH in the range of 3 to 12, desirably to a pH of about 7. The neutralizing agent may be a monovalent alkali such as sodium, potassium, lithium or ammonium hydroxide or the carbonates and bicarbonates thereof, or mixtures of the same, or an amine base having not more than one primary or secondary amine group per molecule. Typical amine neutralizing agents are monoethanol amine, triethanol amine, diisopropanol amine, triethyl amine, the octyl, dodecyl, tetradecyl, hexadecyl, octadecyl, arachic, lauroleic, myristoleic, palmitoleic, oleic, erucic, linoleic, eleostearic, linolenic, didodecyl, ditetradecyl, diocatadecyl, dicoco, di-(octadecenyl-octadecadienyl) trioctyl, tridodecyl, and tricoco amines, and the like and mixtures thereof.

The examples next set forth are presented to illustrate and clarify the invention. The proportions of ingredients are given in parts by weight or weight percents unless otherwise specified.

EXAMPLE I

A series of four acrylic acid/triallyl phosphate copolymers were prepared in benzene diluent using a conventional bottle-polymerization unit. The following recipe was employed.

| Ingredient: | Parts |
| --- | --- |
| Acrylic acid | 98 to 99.5 |
| Triallyl phosphate | 0.5 to 2 |
| Caprylyl peroxide | 0.25 |
| Benzene | 900 |

In the above recipe the total amount of monomers was always equal to 100 parts. The polymerizations were carried out at 70° C. under a nitrogen atmosphere for about 20 hours to obtain a conversion of monomer to polymer of 95%. The reaction product was in the form of a thick slurry from which the copolymer was recovered by filtration. The filter cake was washed with fresh benzene and dried at about 50° C. in an air circulating oven. The dried cake was a white, friable mass which was readily converted into a fine white powder.

Clear aqueous mucilages (gels) were prepared by dispersing a small amount of the powder in a major portion of water and neutralizing the copolymer mixture with a sufficient amount of 28% ammonium hydroxide solution to give a pH of approximately 7 to the final mucilage. The viscosities of the aqueous mucilages were obtained with a Brookfield rotational viscometer operated at 20 r.p.m. The viscosities are expressed hereinbelow in centipoises. In the tabulation of the data a (—) symbol indicates the measurement was not made.

| Copolymer | Percent triallyl phosphate in copolymer | Viscosities of mucilages at below-stated concentration of copolymer in water | |
|---|---|---|---|
| | | 0.2% conc. | 0.5% conc. |
| A | 0.5 | 2,100 | 4,400 |
| B | 1.0 | 12,500 | 70,000 |
| C | 1.5 | — | 30,000 |
| D | 2.0 | — | 18,000 |

EXAMPLE II

In this series of experiments the gelation efficacy of an acrylic acid/triallyl phosphate copolymer (Copolymer B for Example I) was compared to that of two commercially available crosslinked acrylic acid copolymers, more specifically, a copolymer of acrylic acid and 1% by weight of a polyallyl ether of sucrose having an average of about 5.8 allyl groups per each sucrose molecule, hereinafter referred to as Copolymer X, and a copolymer of acrylic acid and 1% by weight of the polyallyl ether of pentaerythritol, i.e., tetraallyl pentaerythritol, hereinafter referred to as Copolymer Y. Aqueous mucilages, which were prepared as in Example I, had the following viscosities at the stated concentration of polymer in water.

| Copolymer | Viscosities | | |
|---|---|---|---|
| | 0.25% conc. | 0.5% conc. | 1% conc. |
| X | 3,200 | 34,000 | 64,000 |
| Y | 21,000 | 56,000 | 68,000 |
| B | 16,000 | 54,000 | 128,000 |

Portions of the foregoing mucilages were left standing exposed to the normal light in a laboratory for one week and the viscosities were measured with the following results.

| Copolymer | Viscosities | | |
|---|---|---|---|
| | 0.25% conc. | 0.5% conc. | 1% conc. |
| X | 3,400 | 32,000 | 59,000 |
| Y | 22,000 | 50,000 | 64,000 |
| B | 27,000 | 56,000 | 82,000 |

Other portions of the mucilages were stored in the dark for one month and the viscosities were then measured with these results.

| Copolymer | Viscosities | | |
|---|---|---|---|
| | 0.25% conc. | 0.5% conc. | 1% conc. |
| X | 3,500 | 34,000 | 60,000 |
| Y | 20,000 | 42,000 | 64,000 |
| B | 26,000 | 66,000 | 98,000 |

The above data illustrate that the crosslinked carboxylic polymers of this invention in general have superior thickening properties and aqueous gels produced therewith have outstanding age-stability.

The shear resistances of the mucilages at 0.5% concentration were also determined by subjecting them to the shearing action of an 11,000 r.p.m. "Waring Blendor" for three minutes, cooling the gels to room temperature and measuring viscosity. The results, set forth below, show that the triallyl phosphate-crosslinked acrylic acid copolymer has superior shear resistance.

| Copolymer: | Viscosity after shearing |
|---|---|
| X | 16,000 |
| Y | 22,000 |
| B | 48,000 |

EXAMPLE III

A series of seven acrylic acid/triallyl phosphate copolymers were prepared according to the procedures set forth in Example I using the folowing recipe.

| Ingredient: | Parts |
|---|---|
| Acrylic acid | 98.7 to 99.3 |
| Triallyl phosphate | 0.7 to 1.3 |
| Caprylyl peroxide | 0.25 |
| Benzene | 900 |

Clear aqueous mucilages prepared from the ammonium salts of the copolymers by the procedure described in Example I had the following viscosities.

| Copolymer | Percent Triallyl Phosphate in Copolymer | Viscosities of Mucilages at Below-stated Concentration of Copolymer in Water | |
|---|---|---|---|
| | | 0.2% conc. | 0.5% conc. |
| E | 0.7 | 32,000 | 58,000 |
| F | 0.8 | 36,000 | 80,000 |
| G | 0.9 | 28,000 | 68,000 |
| H | 1.0 | 30,000 | 68,000 |
| J | 1.1 | 14,000 | 70,000 |
| K | 1.2 | 14,000 | 54,000 |
| L | 1.3 | — | 14,000 |

EXAMPLES IV

In this example mucilages were prepared in the manner set forth in Example I using two copolymers produced in the preceding example in accordance with this invention. These gels were compared to mucilages prepared with the aforementioned commercial thickeners (Copolymer X and Copolymer Y) and a copolymer of acrylic acid and 2.2% by weight of tetravinyl silane, hereinafter referred to as Copolymer Z. The clarity of the mucilages is reported as the "percent transmission" of light through the mucilage at a wave length of 4250 A. using a Fisher Electrophotometer. The data are presented below.

| Copolymer | Viscosities of mucilages | | | |
|---|---|---|---|---|
| | 0.05% conc. | 0.1% conc. | 0.25% conc. | 0.5% conc. |
| X | 10 | 35 | 5,000 | 30,000 |
| Y | 17.5 | 1,600 | 24,000 | 62,000 |
| Z | 22.5 | 330 | 11,500 | 44,000 |
| G | 440 | 6,200 | 42,000 | 64,000 |
| J | 120 | 4,000 | 24,000 | 42,000 |

| Copolymer | Percent light transmission through the above-described mucilages | | | |
|---|---|---|---|---|
| | 0.05% conc. | 0.1% conc. | 0.25% conc. | 0.5% conc. |
| X | 80 | 68 | 48 | 49 |
| Y | 94 | 85 | 61 | 88 |
| Z | 74 | 53 | 29 | 10 |
| G | 99 | 98 | 74 | 56 |
| J | 91 | 81 | 77 | 40 |

The above results show that in the majority of cases the gels prepared with the interpolymers of this invention are unexpectedly thicker and clearer than gels produced with similar carboxylic-containing interpolymers containing other crosslinking monomers.

EXAMPLE V

An interpolymer of acrylic acid and 1% of triallyl phosphite was prepared according to the procedure set forth in Example I from the following recipe.

| | Parts |
|---|---|
| Acrylic acid | 99.0 |
| Triallyl phosphite | 1.0 |
| Benzene | 900 |
| Caprylyl peroxide | 0.5 |

Ammonium hydroxide-neutralized aqueous mucilages prepared with the copolymer had these properties measured on the Brookfield Viscometer at 20 r.p.m.

Viscosities of mucilages, cps.:
0.2% conc. _____ 14,000
0.5% conc. _____ 20,000

I claim:
1. A crosslinked interpolymer of
(A) at least 10% by weight of polymerized units of at least one member selected from the group consisting of acrylic acid and methacrylic acid;
(B) from 0.1 to 2% by weight of polymerized units of a polyallyl monomer selected from the group consisting of

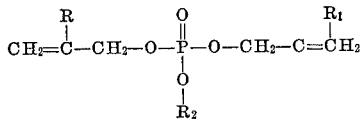

and

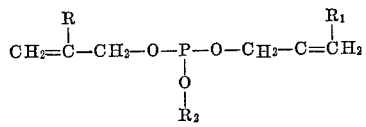

wherein R and $R_1$ are independently selected from the group consisting of a hydrogen atom and a methyl radical, and $R_2$ is selected from the group consisting of a hydrogen atom, an allyl radical, a methallyl radical, an alkyl radical, an aralkyl radical, an aryl radical and an alkaryl radical; and
(C) from 0 to 89.9% by weight of polymerized units of at least one other monoolefinically unsaturated monomer copolymerizable with (A) and (B).

2. The interpolymer of claim 1 wherein the polyallyl monomer is triallyl phosphate.

3. The interpolymer of claim 1 wherein the polyallyl monomer is triallyl phosphite.

4. A crosslinked interpolymer of
(A) at least 50% by weight of polymerized units of at least one member selected from the group consisting of acrylic acid and methacrylic acid;
(B) from 0.1 to 2% by weight of polymerized units of a polyallyl monomer selected from the group consisting of

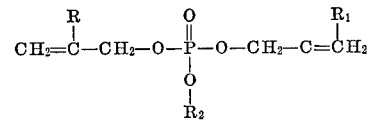

and

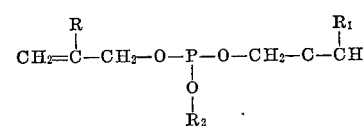

wherein R and $R_1$ are independently selected from the group consisting of a hydrogen atom and a methyl radical, and $R_2$ is selected from the group consisting of a hydrogen atom, an allyl radical, a methallyl radical, an alkyl radical, an aralkyl radical, an aryl radical and an alkaryl radical; and
(C) from 0 to 49.9% by weight of polymerized units of at least one other monoolefinically unsaturated monomer copolymerizable with (A) and (B).

5. The interpolymer of claim 4 wherein the polyallyl monomer is triallyl phosphate.

6. The interpolymer of claim 4 wherein the polyallyl monomer is triallyl phosphite.

7. A crosslinked interpolymer of
(A) at least 90% by weight of polymerized units of at least one member selected from the group consisting of acrylic acid and methacrylic acid;
(B) from 0.1 to 2% by weight of polymerized units of a polyallyl monomer selected from the group consisting of

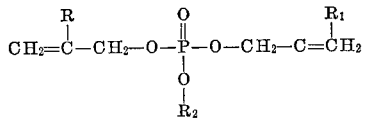

and

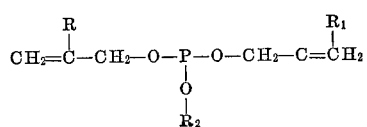

wherein R and $R_1$ are independently selected from the group consisting of a hydrogen atom and a methyl radical, and $R_2$ is selected from the group consisting of a hydrogen atom, an allyl radical, a methallyl radical, an alkyl radical, an aralkyl radical, an aryl radical and an alkaryl radical; and
(C) from 0 to 9.9% by weight of polymerized units of at least one other monoolefinically unsaturated monomer copolymerizable with (A) and (B).

8. The interpolymer of claim 7 wherein the polyallyl monomer is triallyl phosphate.

9. The interpolymer of claim 7 wherein the polyallyl monomer is triallyl phosphite.

10. An interpolymer of from 98 to 99.9% by weight of acrylic acid and 0.1% to 2% by weight of triallyl phosphate.

11. An interpolymer of from 98.75% to 99.25% by weight of acrylic acid and 0.75% to 1.25% by weight of triallyl phosphate.

12. An interpolymer of from 98 to 99.9% by weight of acrylic acid and 0.1% to 2% by weight of triallyl phosphite.

13. An interpolymer of from 98.75% to 99.25% by weight of acrylic acid and 0.75% to 1.25% by weight of triallyl phosphite.

References Cited

UNITED STATES PATENTS 2,923,692   2/1960   Ackerman et al. _____ 260—17.4
3,069,400   12/1962   Halpern _____ 260—87.5

FOREIGN PATENTS 534,826   3/1941   Great Britain.
903,701   8/1962   Great Britain.

JOSEPH L. SCHOFER, Primary Examiner.

STAMFORD M. LEVIN, Assistant Examiner.

U.S. Cl. X.R.

260—66, 78.5, 80, 80.3, 80.71

**PO-1050
(5/69)**

UNITED STATES PATENT OFFICE
CERTIFICATE OF CORRECTION

Patent No. 3,426,004                    Dated February 4, 1969

Inventor(s)   Frank A. Wagner

It is certified that error appears in the above-identified patent and that said Letters Patent are hereby corrected as shown below:

In the specification, the formulae appearing in Column 2, lines 32 and 39 and in the Claims, Column 7, lines 10, 16, 43, 49, and Column 8, lines 11 and 18, that portion of the formula reading $$\begin{array}{c} R_1 \\ | \\ -C=CH_2 \end{array}$$

should read   $\begin{array}{c} R_1 \\ | \\ -C=CH_2 \end{array}$

SIGNED AND
SEALED
JUL 14 1970

(SEAL)
Attest:

Edward M. Fletcher, Jr.
Attesting Officer

WILLIAM E. SCHUYLER, JR.
Commissioner of Patents